(12) United States Patent
Nakao (10) Patent No.: US 8,428,426 B2
(45) Date of Patent: Apr. 23, 2013

(54) DIGITAL VIDEO RECORDING/PLAYBACK APPARATUS

(75) Inventor: Akihiko Nakao, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 12/877,460

(22) Filed: Sep. 8, 2010

(65) Prior Publication Data

US 2011/0129194 A1 Jun. 2, 2011

(30) Foreign Application Priority Data

Nov. 27, 2009 (JP) ................................ 2009-270665
Jul. 27, 2010 (JP) ................................ 2010-168556

(51) Int. Cl.
*H04N 5/76* (2006.01)
*H04N 5/932* (2006.01)
*H04N 5/931* (2006.01)

(52) U.S. Cl.
USPC ........... 386/235; 386/236; 386/237; 386/238; 386/201; 386/203; 386/207; 386/208

(58) Field of Classification Search .......... 386/235–238, 386/201, 203, 207, 208
See application file for complete search history.

(56) References Cited

U.S. PATENT DOCUMENTS

| | | | | |
|---|---|---|---|---|
| 5,093,750 A | * | 3/1992 | Park et al. | 386/327 |
| 6,351,596 B1 | * | 2/2002 | Ostrover | 386/241 |
| 2002/0051628 A1 | * | 5/2002 | Nitta et al. | 386/98 |
| 2003/0113095 A1 | * | 6/2003 | Fujinami | 386/46 |
| 2008/0140950 A1 | * | 6/2008 | Jufuku et al. | 711/154 |
| 2010/0061696 A1 | * | 3/2010 | Aoki | 386/66 |

FOREIGN PATENT DOCUMENTS

| | | |
|---|---|---|
| JP | 10-188477 | 7/1998 |
| WO | WO 2007/099906 A1 | 9/2007 |

OTHER PUBLICATIONS

Office Action issued Oct. 28, 2011 in Japanese Application No. 2010-168556 (With English Translation).

* cited by examiner

*Primary Examiner* — Helen Shibru
(74) *Attorney, Agent, or Firm* — Oblon, Spivak, McClelland, Maier & Neustadt, L.L.P.

(57) ABSTRACT

A digital video recording/playback apparatus is provided in which maximum delay can be easily changed in accordance with the bit rate of inputted video data. The digital video recording/playback apparatus includes a memory unit, a playback unit, a synchronization unit, a synchronization signal counter, and a controller. The synchronization signal counter counts a synchronization signal to generate a frame counter value. The controller outputs a reading start instruction for the video data to the memory unit, and a decoding start instruction for the video data to the playback unit. The controller is configured to determine a first process completion time limit represented by the frame counter value as a process completion time limit for the memory unit and to determine a second process completion time limit represented by the frame counter value as a process completion time limit for the playback unit.

10 Claims, 7 Drawing Sheets

DIGITAL VIDEO RECORDING/PLAYBACK APPARATUS

CROSS-REFERENCE TO RELATED APPLICATIONS

This application is based upon and claims the benefit of priority from the prior Japanese Patent Application No. 2009-270665, filed on Nov. 27, 2009 and Japanese Patent Application No. 2010-168556, filed on Jul. 27, 2010, the entire contents of which are incorporated herein by reference.

FIELD

Embodiments described herein relate to a digital video recording/playback apparatus which records and plays video data.

BACKGROUND

In a broadcasting apparatus of background art which records and plays digital video, processing devices such as a device for storing video data and a device for playing video data are controlled using a synchronization signal (see Japanese Patent Application Publication No. Hei 8-140050).

In the broadcasting apparatus of the background art, timings such as process start timings of a memory unit and a playback unit which perform data processing in synchronization with the synchronization signal are designed with consideration given to maximum delays. The maximum delays refer to maximum times needed for processing by units such as the memory unit and the playback unit.

Since processing time needed by each unit differs depending on the bit rate of video data inputted to the digital video recording/playback apparatus, the maximum delay is determined in accordance with the bit rate of the video data. It should be noted that the determination of the maximum delay takes into consideration not only the processing time according to the bit rate of video data, but also deviations in timings of command transfer between the units which depend on the load on each unit, and other unexpected situations. The maximum delay is defined in units of the period of the synchronization signal, which is a signal having a period equal to a frame period.

Moreover, since each unit performs processing in synchronization with the synchronization signal, timings between the units are controlled. In other words, when each unit receives an instruction (e.g., data transfer request) to perform processing in a certain frame, the timing with which the unit that has received the instruction starts the processing is at a frame subsequent to the frame at which the instruction has been received. Moreover, a unit which performs processing subsequent to the foregoing processing performs the processing at a frame later than a frame at which the previous unit has completed the processing.

As described above, the maximum delay is determined in accordance with the bit rate of inputted video data, timings between the units are designed based on the determined maximum delay. Moreover, operation timings between the units are controlled in synchronization with the synchronization signal.

However, since the operation of each unit is synchronized with the synchronization signal, the design of timings between the units becomes complicated. Moreover, in the case where there is a change in the bit rate of inputted video data, operation timings between the units need to be redesigned. However, it is difficult to cope with a bit rate change.

DETAILED DESCRIPTION

According to embodiments, a digital video recording/playback apparatus includes a memory unit, a playback unit, a synchronization unit, a synchronization signal counter, and a control unit. The memory unit is configured to store video data and load the stored video data. The playback unit is configured to play the video data read from the memory unit. The synchronization unit is configured to send out a synchronization signal to the memory unit and the playback unit. The synchronization signal counter is configured to count the synchronization signal sent from the synchronization unit and generate a frame counter value. The controller is configured to supply the frame counter value to the memory unit and the playback unit, output a reading process start instruction for the video data and a first process completion time limit represented by the frame counter value to the memory unit, and output a decoding process start instruction for the video data and a second process completion time limit represented by the frame counter value to the playback unit.

Hereinafter, the embodiments will be described with reference to drawings.

First Embodiment

Figure 1:
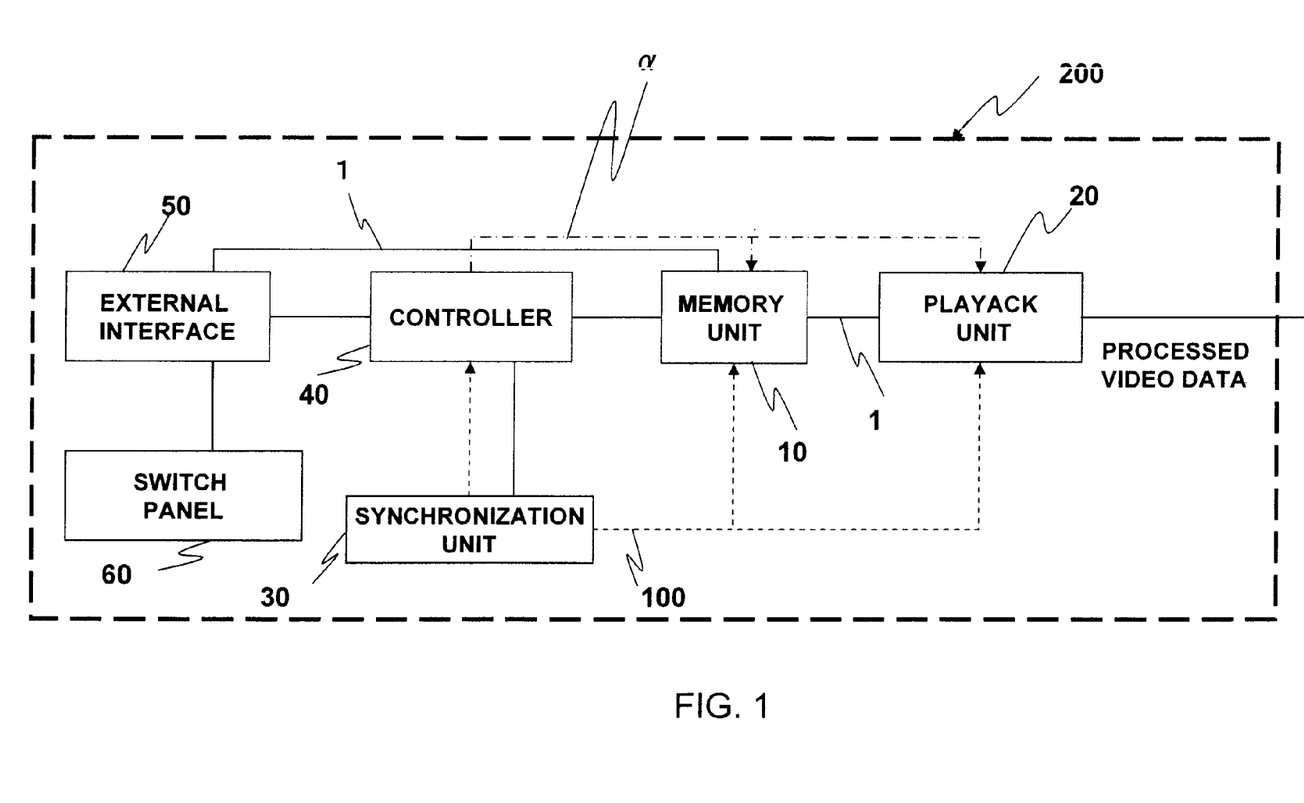
FIG. 1 is a view showing a configuration of a digital video recording/playback apparatus of a first embodiment.

FIG. 1 is a block diagram showing the configuration of a digital video recording/playback apparatus according to a first embodiment.

As shown in FIG. 1, the digital video recording/playback apparatus 200 of this embodiment includes a memory unit 10, a playback unit 20, a synchronization unit 30, a control unit 40, an external interface 50, and a switch panel 60. Each of these units receives and outputs signals, video data, and the like using a data line 1 indicated by solid lines.

It should be noted that the digital video recording/playback apparatus 200 may include units capable of being utilized for digital video recording or playing, such as an unillustrated data recording unit and a file output unit for creating a file for playing.

The memory unit 10 includes a storage medium such as a magnetic disk device, an optical disk device, or a semiconductor memory. The memory unit 10 stores video data captured from an external device such as an unillustrated moving picture camera, and reads and outputs the stored video data. The stored video data is data coded in, for example, MPEG2. Moreover, in the memory unit 10, a frame counter value receiving portion 11 is provided (see FIG. 3) which receives a frame counter value a sent from the control unit 40. In the memory unit 10, the frame counter value receiving portion 11 receives the frame counter value a, and this frame counter value a is used for timing control in processing in the memory unit 10.

Upon receipt of a reading process start instruction from the control unit 40, the memory unit 10 starts a loading process for loading the video data. The memory unit 10 sends the read video data to the playback unit 20. The reading process start instruction contains a process completion time limit indicating a time limit within which the process should be completed. This process completion time limit is represented by the frame counter value a. Moreover, upon completion of the process, the memory unit 10 outputs a process completion notification indicating the completion of the process to the control unit 40.

The playback unit 20 performs processing such as error correction and decode on the video data sent from the memory unit 10, and outputs the processed video data to an external display device (not shown). This series of processing is called a decoding process. Moreover, in the playback unit 20, a frame counter value receiving portion 21 is provided (see FIG. 3) which receives the frame counter value a sent from the control unit 40. In the playback unit 20, the frame counter value receiving portion 21 receives the frame counter value a, and this frame counter value a is used for timing control in processing in the playback unit 20.

Upon receipt of a decoding process start instruction from the control unit 40, the playback unit 20 starts a decoding process. The decoding process start instruction contains a process completion time limit indicating a time limit within which the process should be completed. This process completion time limit is represented by the frame counter value a. Moreover, upon completion of the process, the playback unit 20 outputs a process completion notification indicating the completion of the process to the control unit 40.

The synchronization unit 30 generates a synchronization signal 100, and sends out the synchronization signal 100 to the memory unit 10, the playback unit 20, and the control unit 40. The interval of the synchronization signal 100 is, for example, 33 ms (millisecond), which is equal to the frame period of a general video signal. It should be noted that the interval of the synchronization signal 100 may be shorter than 33 ms or longer than 33 ms. Basic operations of the memory unit 10 and the playback unit 20 are controlled in synchronization with the synchronization signal 100.

Figure 2:
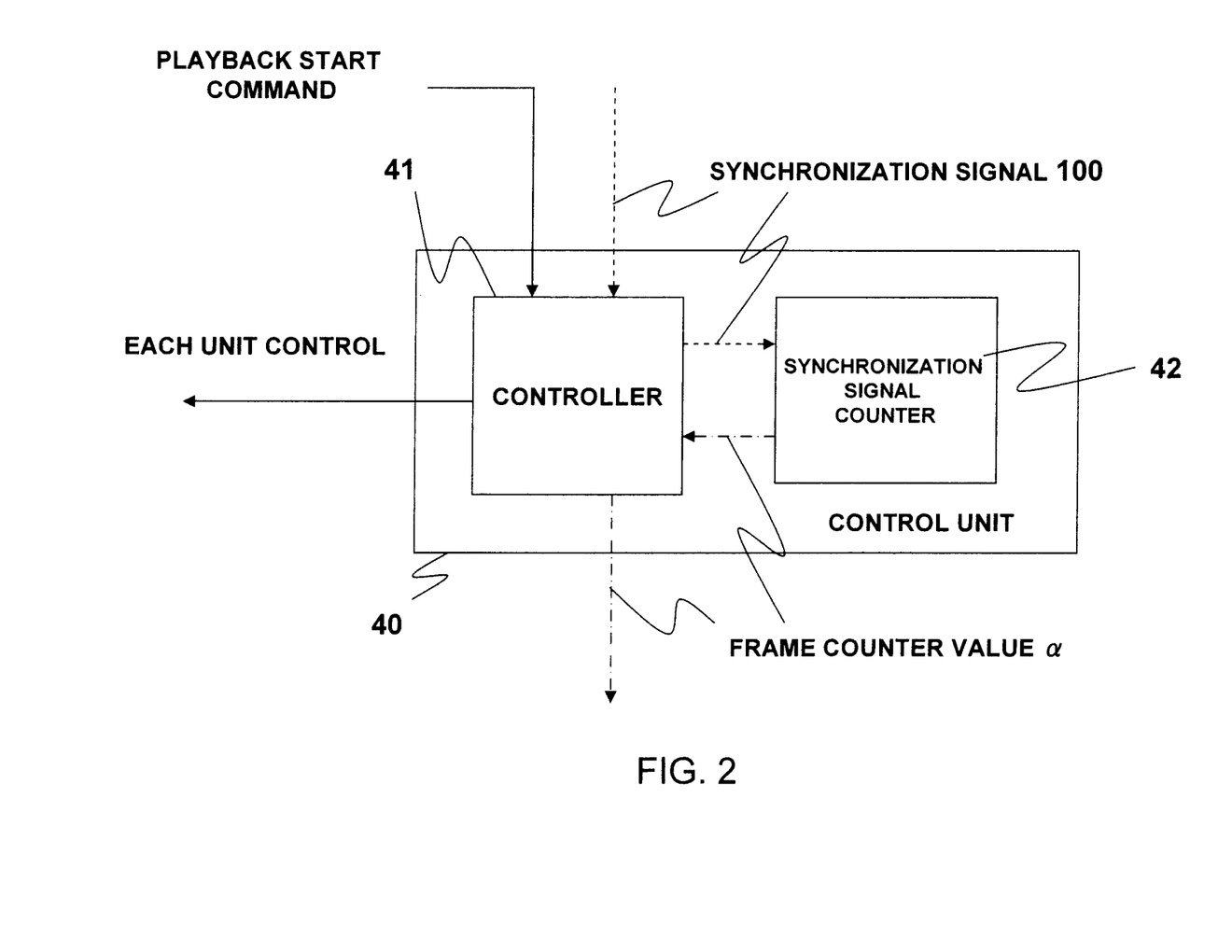
FIG. 2 is a view showing a configuration of a control unit of the first embodiment.

The control unit 40 includes a controller 41 and a synchronization signal counter 42 as shown in FIG. 2.

The controller 41 receives a playback start command sent from the switch panel 60 via the external interface 50, and controls the timings of the operations of the memory unit 10 and the playback unit 20 based on the synchronization signal 100 sent from the synchronization unit 30. Moreover, the controller 41 sends out the frame counter value a received from the synchronization signal counter 42 to the memory unit 10 and the playback unit 20 with a predetermined period.

The switch panel 60 is a user interface including switches corresponding to a playing process and a recording process. When a switch of the switch panel 60 is operated, an instruction to perform a process is inputted to the digital video recording/playback apparatus 200. This instruction is inputted to the control unit 40 through the external interface 50. The switch panel 60 is intended to receive an instruction from a user. Instead of the switch panel 60, an input device such as a keyboard, a mouse, or a touch screen may be used.

Moreover, the controller 41 sends instructions to start processes to the memory unit 10 and the playback unit 20. These instructions contain process completion time limits indicating time limits within which the processes should be completed. These process completion time limits are represented by frame counter values a. It should be noted that an instruction for a process to be performed by each unit is sent for each frame or GOP (Group Of Pictures) of data.

Since the controller 41 specifies a process completion time limit represented by a frame counter value a when sending an instruction to perform a process, the time by which a process completion notification sent from the memory unit 10 or the playback unit 20 should be received is determined. Accordingly, if a process completion notification sent from the memory unit 10 or the playback unit 20 is not received by the controller 41 by a predetermined timing, the controller 41 determines that processing in the memory unit 10 or the playback unit 20 is delayed. Further, if the controller 41 determines that processing is delayed, the controller 41 sends the memory unit 10 or the playback unit 20 an instruction to discard data for which processing is delayed, and adjusts the timing of a subsequent process on the assumption that the previous process is not delayed. In other words, an instruction to start processing data subsequent to the data for which processing is delayed is sent with the same timing as it would be sent if the previous process were not delayed. The process completion time limit contained in this start instruction indicates the same process completion time limit as it would be if the previous process were not delayed.

The synchronization signal counter 42 receives the synchronization signal 100 sent from the synchronization unit 30 through the controller 41. Every time the synchronization signal counter 42 receives the synchronization signal, the synchronization signal counter 42 adds one to the frame counter value a to generate a frame counter value a. The synchronization signal counter 42 sends out the generated frame counter value a to the controller 41.

The synchronization signal 100 is a signal sent from the synchronization unit 30 to the memory unit 10, the playback unit 20, and the control unit 40 with a period equal to the frame period. Operations of the memory unit 10, the playback unit 20, and the control unit 40 are controlled with a period equal to the frame period of the synchronization signal 100.

The frame counter value a is a value obtained by counting the synchronization signal 100. The synchronization signal counter 42 counts the synchronization signal 100 to generate the frame counter value a. For example, in the case where an initial value of the frame counter value a is "0", when the synchronization signal counter 42 receives the synchronization signal for the sixth time, the frame counter value a becomes "6."

Next, operations of this embodiment will be described.

Here, an example will be described in which video data is played per GOP. When a user operates the switch panel 60 to send an instruction to start playback, a playback start command is sent to the control unit 40 through the external interface 50. The controller 41 of the control unit 40 receives the playback start command. Upon receipt of the playback start command, the controller 41 outputs the synchronization signal 100 to the synchronization signal counter 42. The synchronization signal counter 42 receives the synchronization signal 100, and sends out a generated frame counter value a to the controller 41. Then, the controller 41 sends the memory unit 10 and the playback unit 20 playback start instructions. Specifically, the controller 41 sends the memory unit 10 a reading process start instruction, and sends the playback unit 20 a decoding process start instruction. The playback start instructions contain frame counter values a indicating process completion time limits. It should be noted that when the playback start instructions are sent, the frame counter values a indicating the process completion time limits may be sent in signals different from the instructions.

The controller 41 sends out a frame counter value a to the memory unit 10 and the playback unit 20 with a predetermined period.

The cycle of sending a frame counter value a is the period with which a frame counter value a is sent from the controller 41. The cycle of sending a frame counter value a is not necessarily equal to the period of the synchronization signal, and may be equal to, for example, 10 frames (e.g., 330 ms), i.e., the time that it takes to send out the synchronization signal ten times, or may be longer or shorter than 10 frames.

Figure 3:
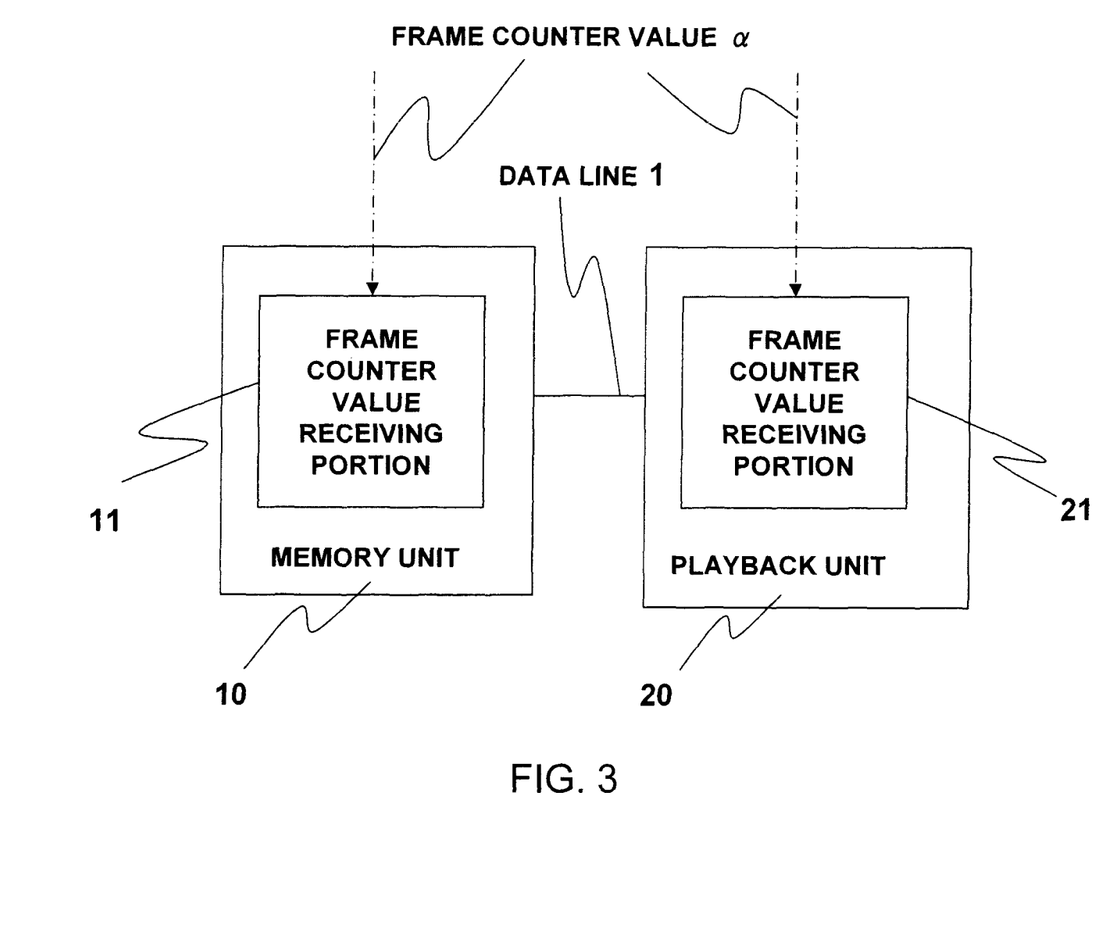
FIG. 3 is a view showing configurations of a memory unit and a playback unit according to the first embodiment.

Such a frame counter value a is received by the frame counter value receiving portion 11 of the memory unit 10 and the frame counter value receiving portion 21 of the playback unit 20, which are shown in FIG. 3. Upon receipt of a frame counter value a, the memory unit 10 and the playback unit 20 compare the frame counter value a with the previously received frame counter value a to determine how much the frame counter value has been increased since the last time a frame counter value a has been received. For example, in the case where the previously received frame counter value a is 100 and where the frame counter value a received this time is 105, it is determined that the frame counter value a has been increased by five during the period from the point of time of the previous receipt to the point of time of the receipt at this time.

Here, the case will be discussed where processing in the memory unit 10 or the playback unit 20 is delayed beyond schedule.

For example, it is assumed that a readout operation in the memory unit 10 is delayed. In this case, the controller 41 memorizes the process completion time limit for the memory unit 10, and determines that processing in the memory unit 10 is delayed if the controller 41 does not receive a process completion notification by the timing with which the process completion notification is supposed to be received from the memory unit 10.

If the controller 41 determines that processing is delayed, the controller 41 sends the memory unit 10 an instruction to discard data for which processing is delayed, and adjusts the timing of a subsequent process on the assumption that the previous process is not delayed. In other words, an instruction to start processing data subsequent to the data for which processing is delayed is sent with the same timing as it would be sent if the previous process were not delayed. Moreover, the process completion time limit contained in this start instruction indicates the same process completion time limit as it would be if the previous process were not delayed. Upon receipt of the instruction to discard data, the memory unit 10 discards the data for which processing is delayed. In the case where processing in the playback unit 20 is delayed, also, as in the case of the memory unit 10, the controller 41 sends an instruction to discard in-process data to the playback unit 20, and the playback unit 20 discards the data for which processing is delayed.

Here, operations of the first embodiment will be specifically described with reference to FIGS. 4 and 5.

Figure 4:
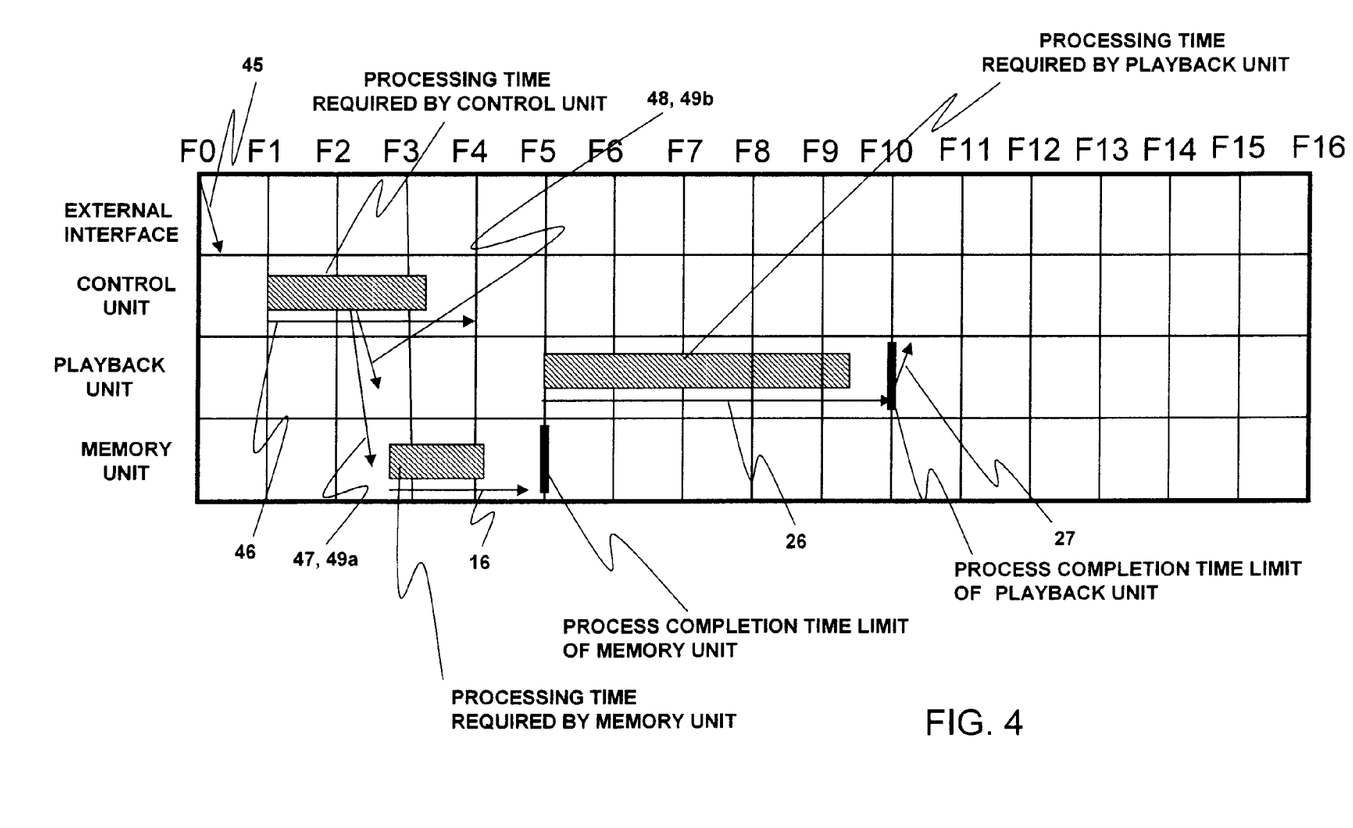
FIG. 4 is a view showing timings of processing of the first embodiment.
Figure 5:
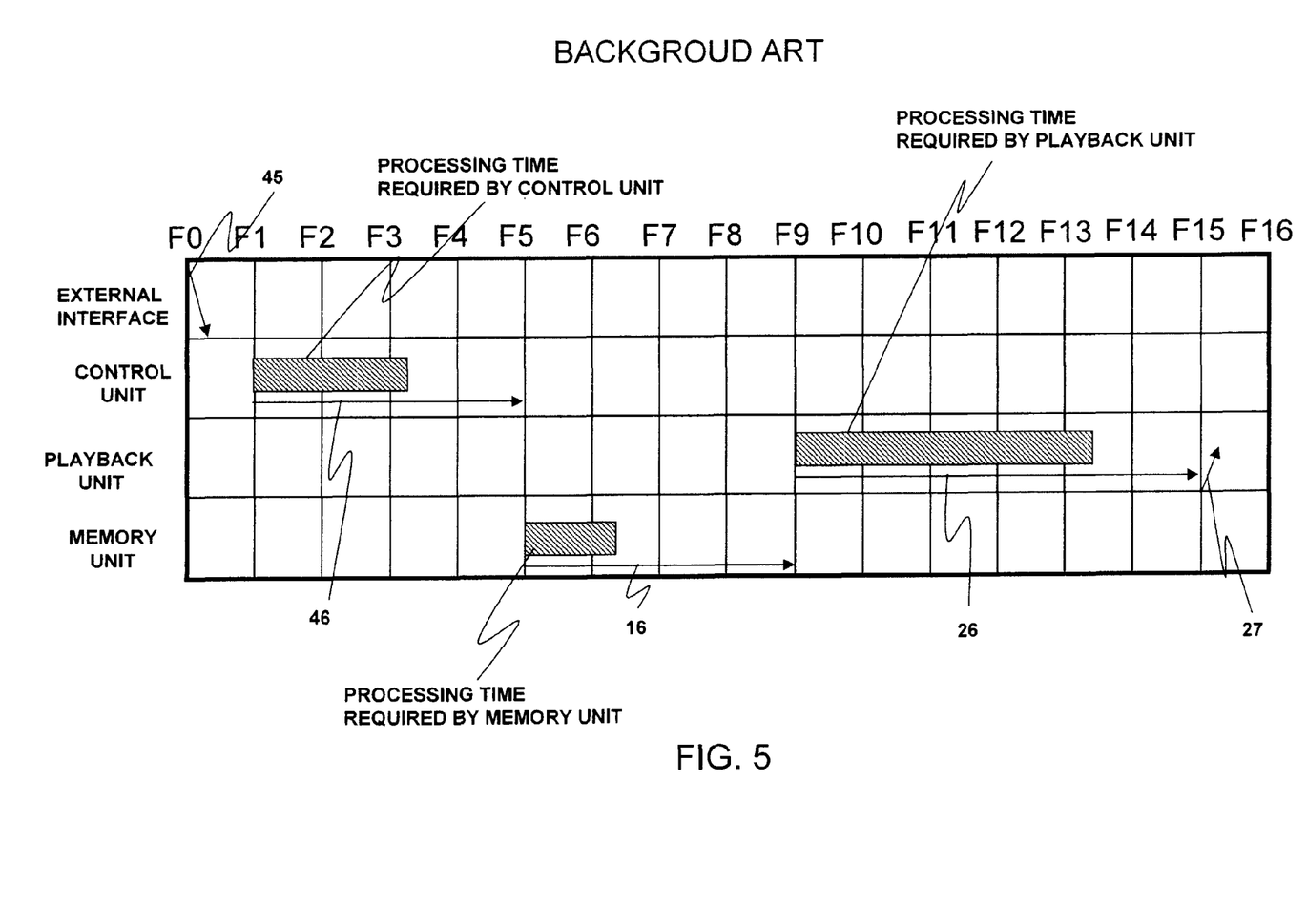
FIG. 5 is a view showing timings of processing of the background art.

FIG. 4 is a view showing the timing of processing in the first embodiment. Each of frames F0 to F16 of FIG. 4 is a timing with which the synchronization signal 100 is received, and the numeral following F is a frame counter value a. FIG. 5 is a view showing the timing of processing of the background art. The timing of processing in the embodiment will be described below while a comparison with the timing of processing of the background art is being made.

(1) The control unit 40 receives a playback start command 45 from the external interface 50 (F0 to F1). The same is true in the background art (F0 to F1).

(2) The control unit 40 notifies the memory unit 10 of a reading process start instruction 47 and notifies the playback unit 20 of a decoding process start instruction 48 within a maximum delay 46 of the control unit (F1 to F4). At this time, the control unit 40 also notifies the memory unit 10 of the process completion time limit 49a (F5) for the memory unit 10, along with the reading process start instruction 47. Further, the control unit 40 also notifies the playback unit 20 of the process completion time limit 49b (F10) for the playback unit 20, along with the decoding process start instruction 48.

It should be noted that maximum delays are determined in accordance with the bit rate of video data and the number of frames of the video data to be processed, and that the process completion time limit for the memory unit 10 and the process completion time limit for the playback unit 20 are determined based on the maximum delays. In the processing of the background art, the maximum delay is set in accordance with video data having the highest bit rate. On the other hand, in this embodiment, since the maximum delay is determined in accordance with the bit rate of video data and the number of frames of the video data to be processed, the maximum delay is set shorter than in the processing of the background art. While the maximum delay 46 of the control unit of the background art is set to a length of four frames from F1 to F5, the maximum delay 46 of the control unit of this embodiment is set to a length of three frames from F1 to F4.

It should be noted that instructions from the control unit 40 to the memory unit 10 and the playback unit 20 contain information on bit rates and information on the number of frames to be processed. In the case of variable-length GOP, the number of frames to be processed is notified without exception. In the case of fixed-length GOP, in an instruction to start processing video data to be processed, information on the number of frames to be processed and a bit rate may be notified to each unit in advance.

It should be noted that a combination of the respective maximum delays of the control unit 40, the playback unit 20, and the memory unit 10 is prepared for each bit rate of video data and each number of frames of the video data to be processed in advance, and that the control unit 40 determines the maximum delay of each unit in accordance with the bit rate of video data and each number of frames of the video data to be processed. Further, based on the respective determined maximum delays, the control unit 40 determines a process completion time limit for the memory unit 10 represented by a frame counter value for each reading process start instruction 47, and determines a process completion time limit for the playback unit 20 represented by a frame counter value for each decoding process start instruction 48.

(3) Upon receipt of the reading process start instruction 47 and the process completion time limit 49a, the memory unit 10 calculates the start timing of a reading process in itself from information contained in the instruction from the control unit 40. The memory unit 10 starts a reading process with the calculated start timing, and sends out the read video data to the playback unit 20 by the process completion time limit (F2 to F5). In the processing of the background art, the maximum delay 16 is set in accordance with video data having the highest bit rate. On the other hand, in this embodiment, since the maximum delay 16 is determined in accordance with the bit rate of video data, the maximum delay 16 is set shorter than in the processing of the background art. While the maximum delay 16 of the processing of the background art is set to a length of four frames from F5 to F9, the maximum delay 16 of this embodiment is set to a length of three frames from F2 to F5. Moreover, in the processing of the background art, the processing is performed in synchronization with the synchronization signal, and therefore the processing is started from a frame subsequent to a frame in which the reading process start instruction has been received.

(4) Upon receipt of the decoding process start instruction 48 and the process completion time limit 49b, the playback unit 20 calculates the start timing of a decoding process in itself from information contained in the instruction from the control unit 40. Since the memory unit 10 needs to read data from a storage medium, the playback unit 20 calculates the start timing in itself from the information contained in the instruction from the control unit 40 with consideration also given to the time of data transfer from the memory unit 10 to the playback unit 20. The playback unit 20 starts a process for decoding the video data sent from the memory unit 10 with the calculated start timing, and performs the data decoding process within the process completion time limit (F5 to F10).

In the processing of the background art, the maximum delay 26 is set in accordance with video data having the highest bit rate. On the other hand, in this embodiment, since the maximum delay 26 is determined in accordance with the bit rate of video data, the maximum delay 26 is set shorter than in the processing of the background art. While the maximum delay 26 of the processing of the background art is set to a length of six frames from F9 to F15, the maximum delay 26 of this embodiment is set to a length of five frames from F5 to F10.

(5) Fifteen-frame video data 27 for one GOP processed in the digital video recording/playback apparatus is outputted to an output buffer (not shown) of the playback unit 20 (after F10). In the processing of the background art, similarly, video data is outputted to an output buffer within the time corresponding to one frame (after F15). Further, the video data temporarily held in the output buffer is outputted to an external display device or the like with a predetermined timing.

After that, for video data of interest, processing from (2) to (5) is repeated until the reading process and the decoding process are completed.

The processing time required for processing from (1) to (5) of this embodiment is compared with the processing time required for processing from (1) to (5) in the processing of the background art. In the processing of the background art, as described above, 16 frames from F0 to F16 are required. On the other hand, in the embodiment, only 10 frames from F0 to F10 are required. Thus, the processing time is reduced by six frames.

Specifying a process completion time limit using a frame counter value a enables processing in each unit to be started asynchronously with a synchronization signal, and makes it possible to reduce the time from the input of a playback command to the output of video.

Figure 6:
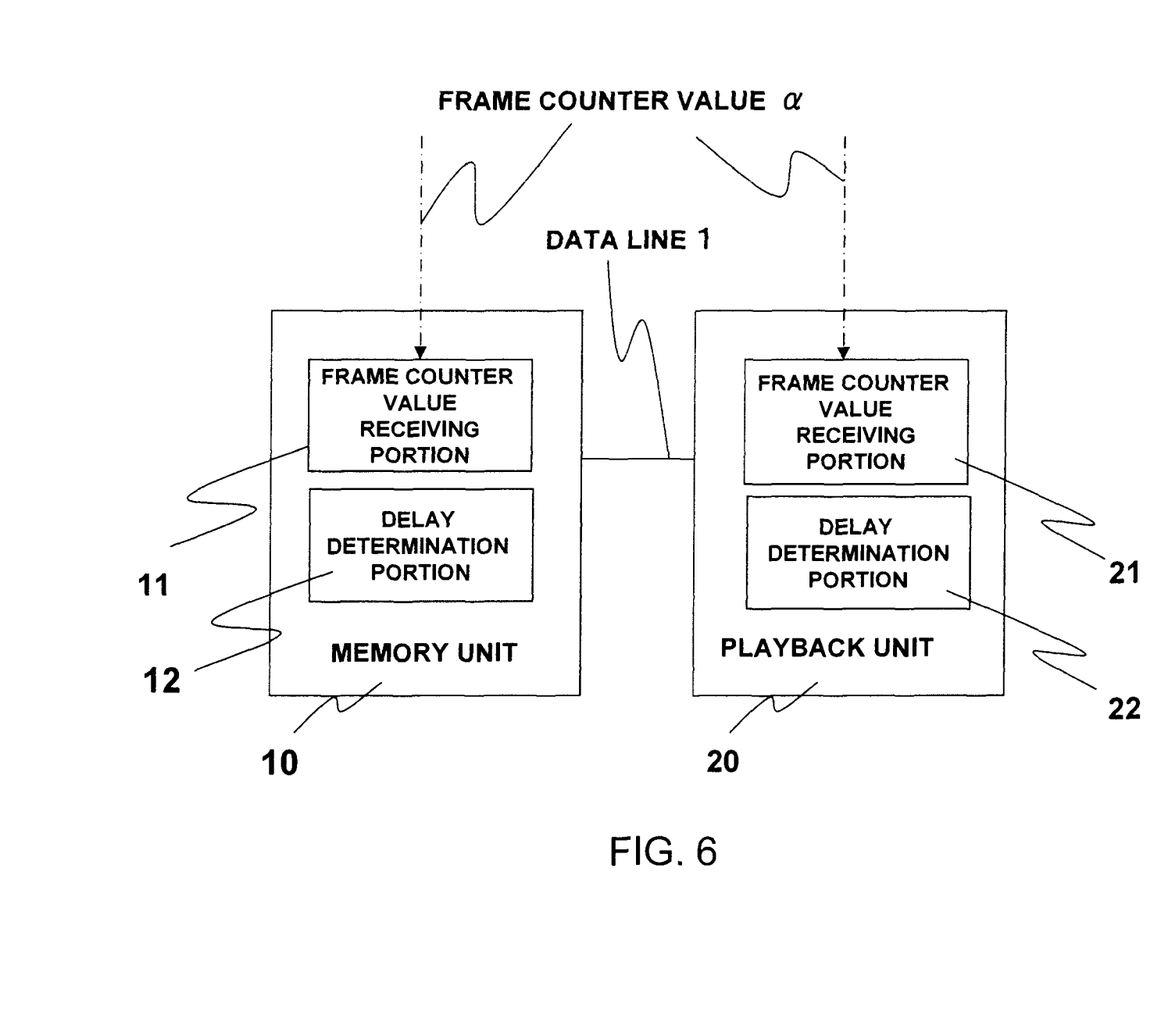
FIG. 6 is a view showing other configurations of the memory unit and the playback unit.

It should be noted that in the above-described embodiment, the controller 41 determines whether processing is delayed or not. However, as shown in FIG. 6, the memory unit 10 or the playback unit 20 itself may have a delay determination portion 12 or 22 for determining whether processing in itself is delayed or not and, when the delay determination portion 12 or 22 determines that processing is delayed, the delay determination portion 12 or 22 may send the controller 41 a notification to that effect. In this case, if the delay determination portion 12 or 22 determines that processing is delayed, the memory unit 10 or the playback unit 20 discards data for which processing is delayed.

For example, a frame counter value a sent from the controller 41 is received by the frame counter value receiving portion 11 of the memory unit 10. At this time, in the case where the received frame counter value a is equal to a frame counter value a which is the process completion time limit, the delay determination portion 12 of the memory unit 10 determines whether processing in the memory unit 10 is delayed or not based on whether the processing has been completed or not. In the case where the processing has not been completed, the delay determination portion 12 determines that the processing is delayed, and the memory unit 10 discards the data for which processing is delayed. It should be noted that in this case, the control unit 40 sends a frame counter value a to the memory unit 10 and the playback unit 20 with, for example, the period of the synchronization signal. It should be noted that the control unit 40 may not only send a frame counter value a with a predetermined period but also send a frame counter value a at a process completion time limit to the memory unit 10 or the playback unit 20 to which the process completion time limit is applied.

In this way, the digital video recording/playback apparatus of the embodiment can recover delay in processing in the memory unit 10 or the playback unit 20 without restarting the entire apparatus. Accordingly, a digital video recording/playback apparatus in which the maximum delay of the memory unit 10 or the playback unit 20 is reduced can be designed and constructed.

Further, reducing the maximum delay of the memory unit 10 or the playback unit 20 makes it possible to reduce the time required for data processing in the entire digital video recording/playback apparatus.

Moreover, controlling the timing of processing in the memory unit 10 or the playback unit 20 using a frame counter value a reduces the load of designing in which consideration is given to the processing speed of another memory unit or playback unit. This facilitates sequence control over a plurality of digital video recording units. In other words, the embodiment provides a digital video recording/playback apparatus in which maximum delay can be easily changed in accordance with the bit rate of inputted video data.

Second Embodiment

Figure 7:
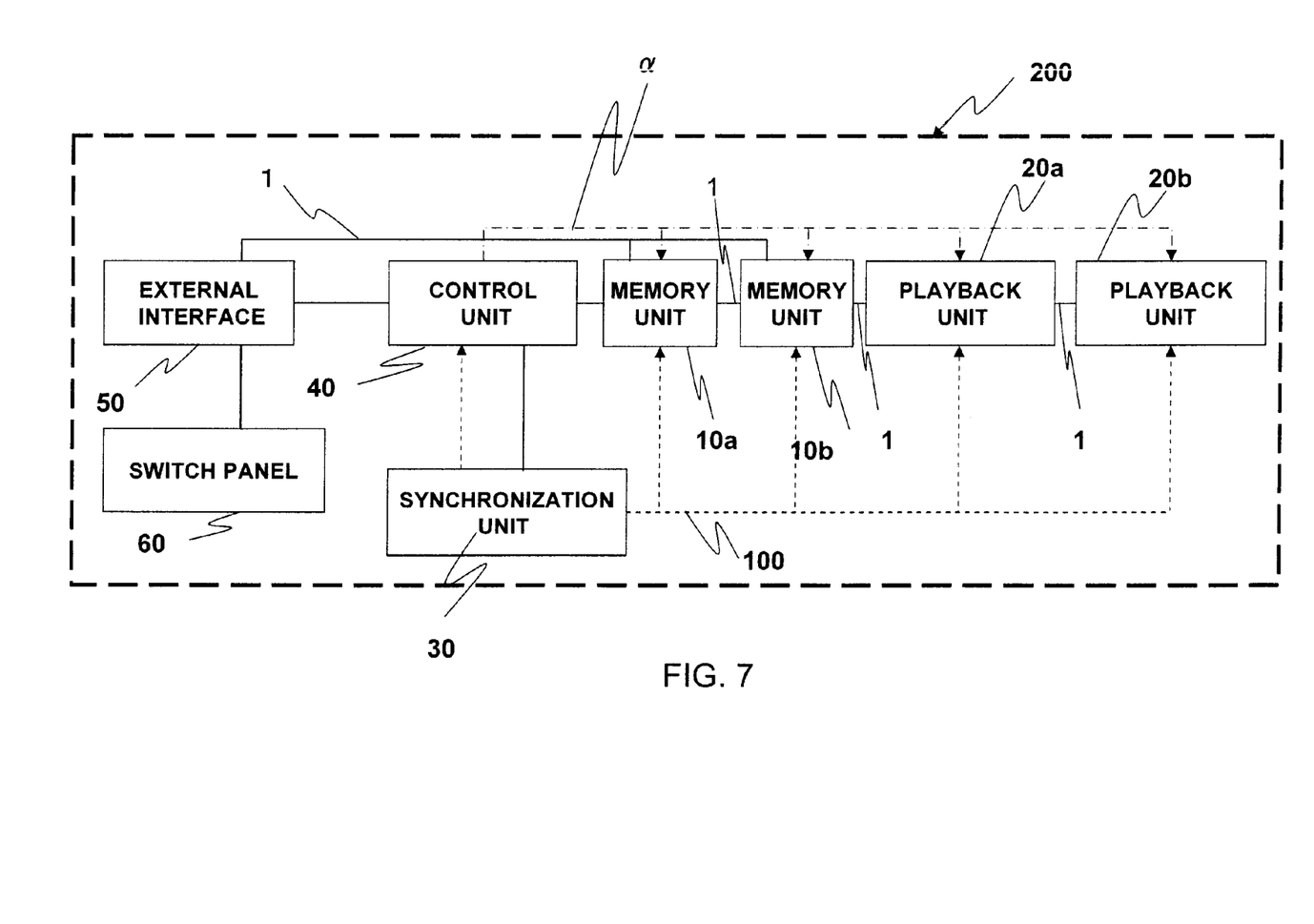
FIG. 7 is a view showing a configuration of a digital video recording/playback apparatus of a second embodiment.

FIG. 7 is a block diagram showing the configuration of a digital video recording/playback apparatus according to a second embodiment.

This embodiment differs from the first embodiment in that this embodiment includes a plurality of memory units and a plurality of playback units. For the sake of simplicity, the digital video recording/playback apparatus 200 shown in FIG. 7 includes two memory units 10a and 10b and two playback units 20a and 20b. However, the digital video recording/playback apparatus 200 may include more memory units and more playback units.

In the case where any one of the memory units 10a and 10b and the playback units 20a and 20b is newly attached to the digital video recording/playback apparatus, the controller 41 sends out a frame counter value a to the attached unit. Moreover, in the case where any one of the memory units 10a and 10b and the playback units 20a and 20b is detached during a period in which other unit is playing video data, the controller 41 continues processing without affecting other units. The same is true in the case where the playback unit 20a or 20b is detached for maintenance or the like.

The memory unit 10b has functions similar to those of the memory unit 10a, and increases the memory capacity of the digital video recording/playback apparatus. The digital video recording/playback apparatus handles the plurality of memory units 10a and 10b as backup units of each other.

Accordingly, even when one memory unit is detached, the other memory unit functions as a memory unit.

The playback unit 20*b* has functions similar to those of the playback unit 20*a*. The plurality of playback units 20*a* and 20*b* play the same video data, and the processed video data from any one of the playback units is outputted to an external display device. Even when any one of the playback units is detached, the operation of the entire apparatus is not impaired.

Here, a description will be made of the operation in the case where the memory unit 10*b* is detached for maintenance or the like once and then attached.

When the memory unit 10*b* is detached, the control unit 40 detects that the memory unit 10*b* has been detected. After that, the memory unit 10*a* and the playback unit 20*a* are synchronized with each other as a digital video recording/playback apparatus without the memory unit 10*b*.

In the case where the memory unit 10*b* is then attached again, the controller 41 in the control unit 40 detects that the memory unit 10*b* has peen attached. The controller 41, which has determined that the memory unit 10*b* has been attached, sends out a frame counter value a to the memory units 10*a* and 10*b* and the playback units 20*a* and 20*b*.

The memory units 10*a* and 10*b* and the playback units 20*a* and 20*b*, which have been newly given the frame counter value a, are synchronized with each other and operate as a digital video recording/playback apparatus including the memory unit 10*b*.

According to the digital video recording/playback apparatus of the second embodiment, as the digital video recording/playback apparatus of the first embodiment, maximum delay can be easily changed in accordance with the bit rate of inputted video data.

Further, according to the digital video recording/playback apparatus of the second embodiment, the memory unit 10*a*, the memory unit 10*b*, the playback unit 20*a*, or the playback unit 20*a* can be inserted or removed without stopping functions of the digital video recording/playback apparatus.

Accordingly, it is possible to remove burdens such as the need for a user to have a plurality of digital video recording/playback apparatuses in order to use a digital video recording/playback apparatus during maintenance and the need for a user to perform maintenance at midnight in order not to interfere with TV broadcasting during daytime.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A digital video recording/playback apparatus comprising:
    a memory unit configured to store video data and read the stored video data;
    a playback unit configured to play the video data read from the memory unit;
    a synchronization unit configured to send out a synchronization signal to the memory unit and the playback unit;
    a synchronization signal counter configured to count the synchronization signal sent from the synchronization unit and generate a frame counter value; and
    a controller configured to supply the frame counter value to the memory unit and the playback unit, output a reading process start instruction for the video data and a first process completion time limit represented by the frame counter value to the memory unit, and output a decoding process start instruction for the video data and a second process completion time limit represented by the frame counter value to the playback unit; wherein
    the memory unit calculates a start timing of a reading process based on the first process completion time limit and starts the reading process at the start timing of the reading process calculated; and
    the playback unit calculates a start timing of a decoding process based on the second process completion time limit and starts the decoding process at the start timing of the decoding process calculated.

2. The digital video recording/playback apparatus according to claim 1, wherein if a reading process in the memory unit is delayed beyond the first process completion time limit, the memory unit discards in-process video data.

3. The digital video recording/playback apparatus according to claim 2, wherein the memory unit includes a delay determination portion for determining whether processing in the memory unit itself is delayed or not.

4. The digital video recording/playback apparatus according to claim 2, wherein if the memory unit discards the in-process video data, the reading process start instruction and the decoding process start instruction for processing video data subsequent to the discarded video data are sent with the same timings as they would be sent if processing delayed beyond the first process completion time limit were not delayed.

5. The digital video recording/playback apparatus according to claim 2, wherein if the playback unit discards the in-process video data, the reading process start instruction and the decoding process start instruction for processing video data subsequent to the discarded video data are sent with the same timings as they would be sent if processing delayed beyond the second process completion time limit were not delayed.

6. The digital video recording/playback apparatus according to claim 1, wherein if a decoding process in the playback unit is delayed beyond the second process completion time limit, the playback unit discards in-process video data.

7. The digital video recording/playback apparatus according to claim 6, wherein the playback unit includes a delay determination portion for determining whether processing in the playback unit itself is delayed or not.

8. The digital video recording/playback apparatus according to claim 1, wherein the controller notifies the memory unit and the playback unit of the bit rate of the video data stored in the memory unit and the number of frames of the video data to be processed.

9. A digital video recording/playback apparatus comprising:
    a memory unit configured to store video data and read the stored video data;
    a playback unit configured to play the video data read from the memory unit;
    a synchronization unit configured to send out a synchronization signal to the memory unit and the playback unit;
    a synchronization signal counter configured to count the synchronization signal sent from the synchronization unit and generate a frame counter value; and
    a controller configured to supply the frame counter value to the memory unit and the playback unit, output a reading process start instruction for the video data and a first process completion time limit represented by the frame counter value to the memory unit, and output a decoding process start instruction for the video data and a second process completion time limit represented by the frame counter value to the playback unit; wherein when a reading process is completed, the memory unit sends out a first process completion notification to the controller, and if the controller does not receive the first process completion notification by the first process completion time limit, the controller sends the memory unit an instruction to discard the in-process video data, and the memory unit discards the in-process video data.

10. A digital video recording/playback apparatus comprising:

a memory unit configured to store video data and read the stored video data;

a playback unit configured to play the video data read from the memory unit;

a synchronization unit configured to send out a synchronization signal to the memory unit and the playback unit;

a synchronization signal counter configured to count the synchronization signal sent from the synchronization unit and generate a frame counter value; and a controller configured to supply the frame counter value to the memory unit and the playback unit, output a reading process start instruction for the video data and a first process completion time limit represented by the frame counter value to the memory unit, and output a decoding process start instruction for the video data and a second process completion time limit represented by the frame counter value to the playback unit; wherein when the decoding process is completed, the playback unit sends out a second process completion notification to the controller, and if the controller does not receive the second process completion notification by the second process completion time limit, the controller sends the playback unit an instruction to discard the in-process video data and the playback unit discards the in-process video data.

* * * * *